S. SANDERSON.
ALARM AND FIRE-EXTINGUISHER.
No. 7,354. Reissued Oct. 17, 1876.
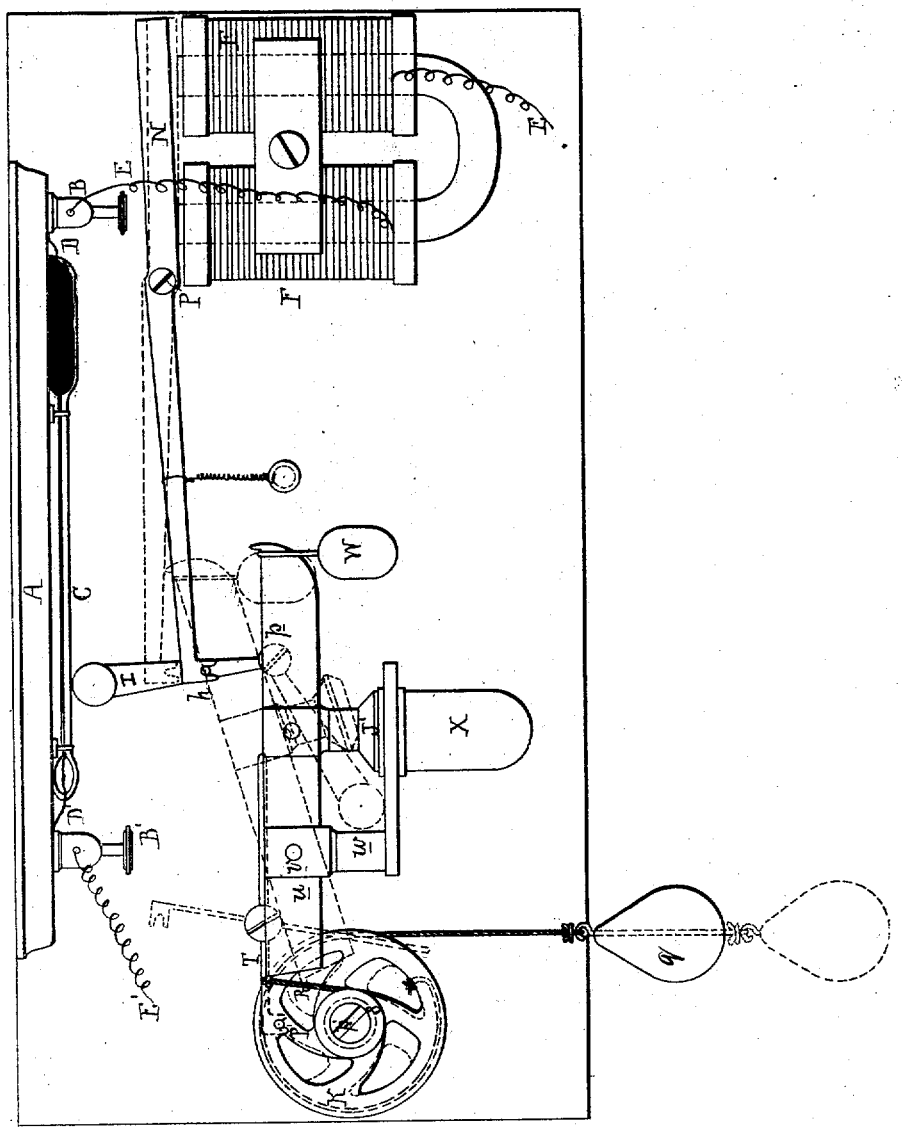
Witnesses
Hermann Moessner
Henry Smith
Solomon Sanderson
by his Attorneys
Howson and Son

UNITED STATES PATENT OFFICE.

SOLOMON SANDERSON, OF HUDDERSFIELD, ENGLAND.

IMPROVEMENT IN ALARMS AND FIRE-EXTINGUISHERS.

Specification forming part of Letters Patent No. 162,579, dated April 27, 1875; reissue No. 7,354, dated October 17, 1876; application filed September 11, 1876.

*To all whom it may concern:*

Be it known that I, SOLOMON SANDERSON, of Huddersfield, in the county of York, England, have invented certain Improvements in Apparatus for Extinguishing Fires and Giving an Alarm, of which the following is a specification:

This invention relates to thermostatic apparatus, whereby the expansion of mercury or other substance, or of an elastic vessel capable of expansion by heat, such as caoutchouc or skin bladder containing a fluid, is made to operate a cock or valve, so as to allow steam, water, or other suitable fluids or gases to escape, for the purpose of extinguishing fires, as illustrated in the English patent granted to me, A. D, 1871, No. 1,899.

The drawing illustrates the arrangement which I prefer to use in apparatus constructed according to this invention, though this arrangement must necessarily be varied according to the circumstances under which the apparatus is used, and according to the form of expansive agent or thermometers, batteries, magnets, and materials employed.

A is the thermometer. B B′ are the binding-screws; C, the glass bulb and tube containing mercury; D, a platinum wire connecting the mercury with the binding-screw B; and D′, the wire protruding into the empty space of the tube, and connected with the binding-screw B′. E E′ are wires connecting the thermometer with the battery and electro-magnet F F, which attracts the armature marked N, when the mercury in the bulb is expanded by undue heat to the platinum wire D′. The armature N is prolonged and centered at P, having at its prolonged end a notch or catch, *h*, to hold the weighted lever I, which is centered at *p*. J′ is a cock or valve, which may be attached at any steam, water, or other fluid supply. K is a wheel mounted on a pin or spindle, *p′*, and *q* a weight to cause it to turn in the direction of the arrow, which winds the chain R onto the boss S, thus pulling down the weighted lever *u*, which is centered at *v* on the upright *w*, and so raising or opening the valve J′. The lever *u* is prolonged to the weight W, which has the effect of keeping the valve J′ closed when the apparatus is at rest. X is a steam, water, or fluid pipe, communicating with a boiler or reservoir. P′ is a pin projecting from the wheel K, which is held by a notch or catch in the lever marked T, thus allowing the cock or valve to remain closed.

The apparatus, as shown on the drawing, is ready to act on the thermometer, taking effect by undue heat caused by conflagration in the building or hold of a vessel in which the apparatus is fixed. The mercury rises in the thermometer, and comes in contact with the end of D′ circuit-wire, the other end of the circuit-wire being already in contact. An electric current immediately acts on the magnet F F, which draws down the armature N and releases the lever I, which, falling, strikes the end of the lever T, releases the wheel K, and allows the weight to descend and open the cock or valve J′, as already described, thereby admitting steam or other suitable fluid to the building to extinguish the conflagration. The dotted lines show the apparatus thus thrown into action.

I claim as my invention—

1. The combination, in an automatic apparatus for extinguishing fires, of a valve for governing the discharge of the extinguishing element, with a magnet constructed and arranged substantially as described, and serving to open the valve upon an undue increase of heat in the room in which it is situated.

2. The cock or valve J′, weighted lever *u*, wheel K, and weight *q*, in combination with the holding-catch T, percussive lever I, and lever N, moved by or through the expansion of a thermostat, substantially as and for the purpose set forth.

In testimony whereof I have signed my name to this specification in the presence of two subscribing witnesses.

SOLOMON SANDERSON.

Witnesses:

HERMANN MOESSNER,

HARRY SMITH.